(12) United States Patent
Fasoli et al.

(10) Patent No.: US 8,638,935 B2
(45) Date of Patent: Jan. 28, 2014

(54) SYSTEM AND METHOD FOR KEY SPACE DIVISION AND SUB-KEY DERIVATION FOR MIXED MEDIA DIGITAL RIGHTS MANAGEMENT CONTENT

(75) Inventors: Gianpaolo Fasoli, Palo Alto, CA (US); Augustin J. Farrugia, Cupertino, CA (US); Bertrand Mollinier Toublet, Santa Clara, CA (US); Gelareh Taban, Sunnyvale, CA (US); Nicholas T. Sullivan, Sunnyvale, CA (US); Srinivas Vedula, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 13/349,451

(22) Filed: Jan. 12, 2012

(65) Prior Publication Data
US 2013/0182842 A1 Jul. 18, 2013

(51) Int. Cl.
*H04L 9/14* (2006.01)

(52) U.S. Cl.
USPC ............. 380/255; 380/45; 380/281; 380/284; 380/44; 713/26; 713/27

(58) Field of Classification Search
USPC ........ 380/45, 200, 255, 281, 284, 44; 713/26, 713/27
See application file for complete search history.

(56) References Cited

U.S. PATENT DOCUMENTS

| | | | |
|---|---|---|---|
| 6,295,359 B1 * | 9/2001 | Cordery et al. ................. | 380/44 |
| 7,409,562 B2 | 8/2008 | Kahn et al. | |
| 7,421,082 B2 | 9/2008 | Kamiya et al. | |
| 7,516,331 B2 | 4/2009 | Jin et al. | |
| 7,774,621 B2 * | 8/2010 | Morino et al. ................. | 713/193 |
| 7,849,016 B2 * | 12/2010 | So ................................... | 705/59 |
| 2006/0010324 A1 * | 1/2006 | Appenzeller et al. ......... | 713/171 |
| 2006/0173787 A1 | 8/2006 | Weber et al. | |
| 2006/0271559 A1 * | 11/2006 | Stavrakos et al. .............. | 707/10 |
| 2007/0067643 A1 * | 3/2007 | Zhuk et al. ..................... | 713/187 |
| 2007/0263875 A1 * | 11/2007 | Kitaya et al. ................... | 380/279 |
| 2008/0037785 A1 * | 2/2008 | Gantman et al. ............... | 380/259 |
| 2011/0228942 A1 * | 9/2011 | Fahrny et al. .................. | 380/278 |
| 2011/0243332 A1 * | 10/2011 | Akimoto ........................ | 380/281 |
| 2013/0024689 A1 * | 1/2013 | Liu et al. ........................ | 713/168 |

* cited by examiner

*Primary Examiner* — Kambiz Zand
*Assistant Examiner* — Tongoc Tran
(74) *Attorney, Agent, or Firm* — Novak Druce Connolly Bove + Quigg LLP

(57) ABSTRACT

Disclosed herein are systems, methods, and non-transitory computer-readable storage media for key space division and sub-key derivation for mixed media digital rights management content and secure digital asset distribution. A system practicing the exemplary method derives a set of family keys from a master key associated with an encrypted media asset using a one-way function, wherein each family key is uniquely associated with a respective client platform type, wherein the master key is received from a server account database, and identifies a client platform type for a client device and a corresponding family key from the set of family keys. The system encrypts an encrypted media asset with the corresponding family key to yield a platform-specific encrypted media asset, and transmits the platform-specific encrypted media asset to the client device. Thus, different client devices receive device-specific encrypted assets which can be all derived based on the same master key.

24 Claims, 7 Drawing Sheets

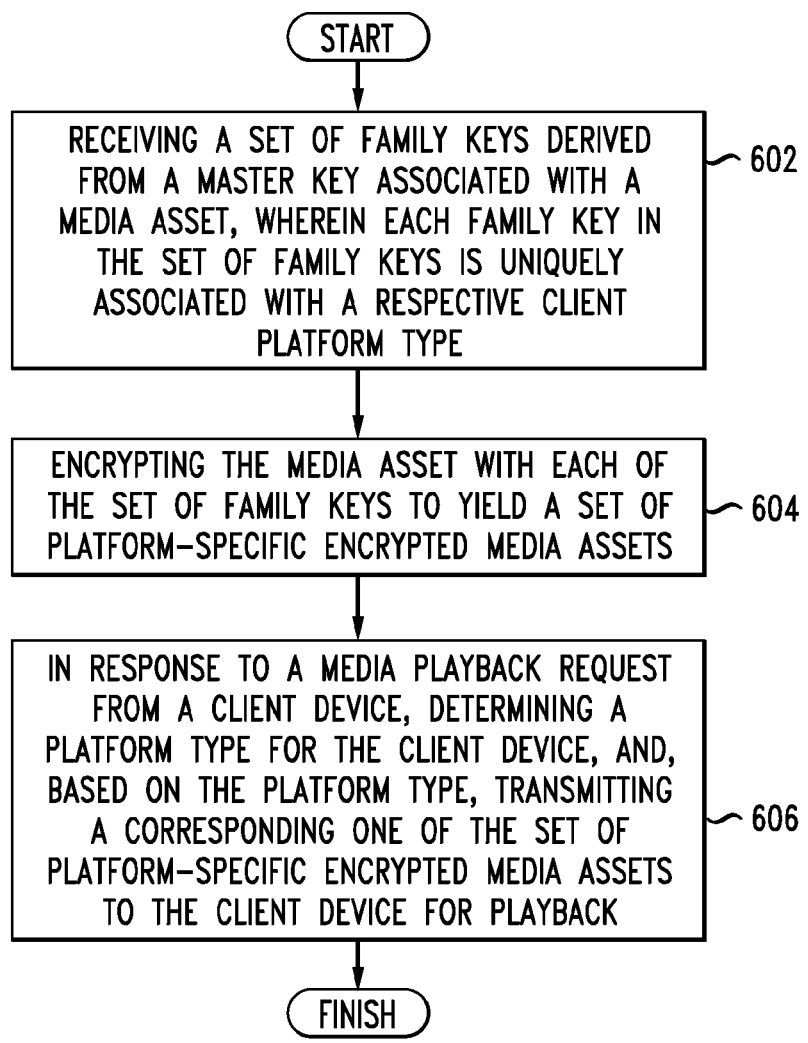

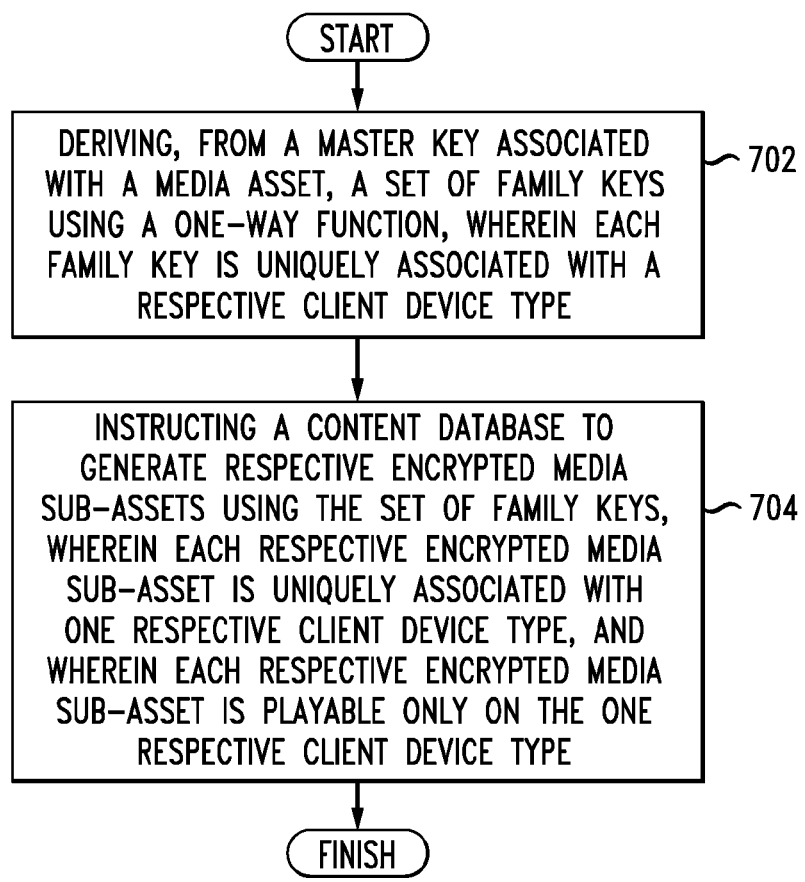

SYSTEM AND METHOD FOR KEY SPACE DIVISION AND SUB-KEY DERIVATION FOR MIXED MEDIA DIGITAL RIGHTS MANAGEMENT CONTENT

BACKGROUND

1. Technical Field

The present disclosure relates to content distribution and more specifically to securing media using sub-key derivation for mixed media secured content.

2. Introduction

Content distributors are faced today with an increasing number of device types which are capable playing secure content. These different device types often have different capabilities. One solution to this problem is a mixed media asset bundle. Such a bundle can include multiple different types, forms, sizes, and qualities of the media. For example, a mixed media asset bundle can include low resolution video, high definition video, monaural audio, stereo audio, audio in different languages, surround audio, text, and still images. In mixed media asset bundles, media decryption happens in different components of the system for different kinds of media. A video pipeline decrypts video content, an audio pipeline decrypts audio content, an image library decrypts images, a text rendering engine decrypts text, and so forth. If there is one master key for the whole asset, a security breach that reveals the master key in one media subsystem can put the other subsystems and/or the master key itself at risk. The master key should not be revealed, and expansion of the master key database should be kept to a minimum, because space is very costly because there is a key set per account.

One solution is multiple key domains. For example, sub-asset 1 is protected with a key, and that key is protected 4 different times. Thus, the decryption key is protected N different times with N different encryption schemes, one for each target platform, such that if an attacker broke a particular sub-asset on one platform, attackers would not be able to perform the same task on other platforms using the same attack. This approach does not scale well. Each one of those keys is protected differently but all of the copies of the keys live inside the asset. So when a user purchases content, the server sends the user the protection of all the keys so the user can play that content everywhere, no matter where the content is synced or streamed. However, in each one of those places the client will be playing it, the server will send the client only one of the keys protecting the individual copies of the decryption keys. A given movie can have one key for each track. More tracks lead to more keys in the database, which quickly becomes absurd. One movie purchase can generate 8, 9, or more keys in the database.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure can provide a way to allow secure playback of mixed media asset bundles while avoiding revealing the master key and without expanding the master key database. This approach uses a single master key, from which multiple dependent keys (or family keys) are derived. Dependent keys are derived using a custom one-way function and identified client side using key space splintering. The key space is split into multiple subspaces, one for each media type in the mixed media asset bundle or for each possible type in the mixed media asset bundle. Keys for the subspaces are computed on the fly and can be identified through a mathematical function on their identifiers.

Further, this approach addresses both the key domain space and scalability issues. One master key protects all the assets and sub-assets because the system derives subkeys from the master key instead of generating and storing subkeys in advance. The system derives subkeys using a one-way function that only exists on the server and the master keys never reveal to any clients information which can be used to break the content protection scheme. In this way, only the content distributor knows and has access to the master key.

In one implementation, a media playback client communicates with a transaction server which generates family keys for media based on a master key from a server account database. The master key can be associated with a user or with the media playback client, for example. Then a server content database serves media content to the media playback client, wherein the media content is encrypted using the corresponding family key or keys derived therefrom. The transaction server sends all the decryption keys to the media playback client, but only a subset of family keys for which the media playback client is authorized.

A deterministic, one-way function hash function can generate multiple keys from one master key. This can reduce load on a key database because the database does not store all the sub-keys or family keys, which are instead generated on-the-fly. This approach also provides key domain flexibility in that a compromised family key only affects one class or type of machine, and not others. For example, a compromised family key for a mobile device operating system would not pose a security risk for a family key derived from the same master key for a desktop operating system.

Disclosed are systems, methods, and non-transitory computer-readable storage media for secure media distribution. A system practicing the exemplary method receives a master key associated with an encrypted media asset, and derives a set of family keys from the master key using a one-way function, wherein each family key is uniquely associated with a respective client platform type. After identifying a client platform type for a client device and a corresponding family key from the set of family keys, the system retrieves the encrypted media asset and encrypting the encrypted media asset with the corresponding family key to yield a platform-specific encrypted media asset. Then the system can transmit the platform-specific encrypted media asset to the client device.

Also disclosed are systems, methods, and non-transitory computer-readable storage media for client-side retrieval and playback of secure media. An exemplary client transmits a request for media content to a transaction server, wherein the request includes an identification of a system device type. The client receives, from the transaction server, the media content, wherein the media content is encrypted by the transaction server using a family key associated with the system device type, and wherein the family key is derived from a master key. Then the client can decode the media content for playback using a corresponding system device type key.

Also disclosed are systems, methods, and non-transitory computer-readable storage media for a server content database. The content server receives a set of family keys derived from a master key associated with a media asset, wherein each family key in the set of family keys is uniquely associated with a respective client platform type. The content server encrypts the media asset with each of the set of family keys to yield a set of platform-specific encrypted media assets, and, in response to a media playback request from a client device, determines a platform type for the client device. Based on the platform type, the content server transmits a corresponding one of the set of platform-specific encrypted media assets to the client device for playback.

Also disclosed are systems, methods, and non-transitory computer-readable storage media for a transaction server. The transaction server derives, from a master key associated with a media asset, a set of family keys using a one-way function, wherein each family key is uniquely associated with a respective client device type. Then the transaction server instructs a content database to generate respective encrypted media sub-assets using the set of family keys, wherein each respective encrypted media sub-asset is uniquely associated with one respective client device type, and wherein each respective encrypted media sub-asset is playable only on the one respective client device type.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an example method embodiment for a server content database; and FIG. 7 illustrates an example method embodiment for a transaction server.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for more effectively using a master key to protect mixed media assets in a content distribution architecture via key space division. A brief introductory description of a basic general purpose system or computing device in FIG. 1 which can be employed to practice the concepts is disclosed herein. The disclosure now turns to FIG. 1, after which the disclosure will continue to discuss securing content distribution.

Figure 1:
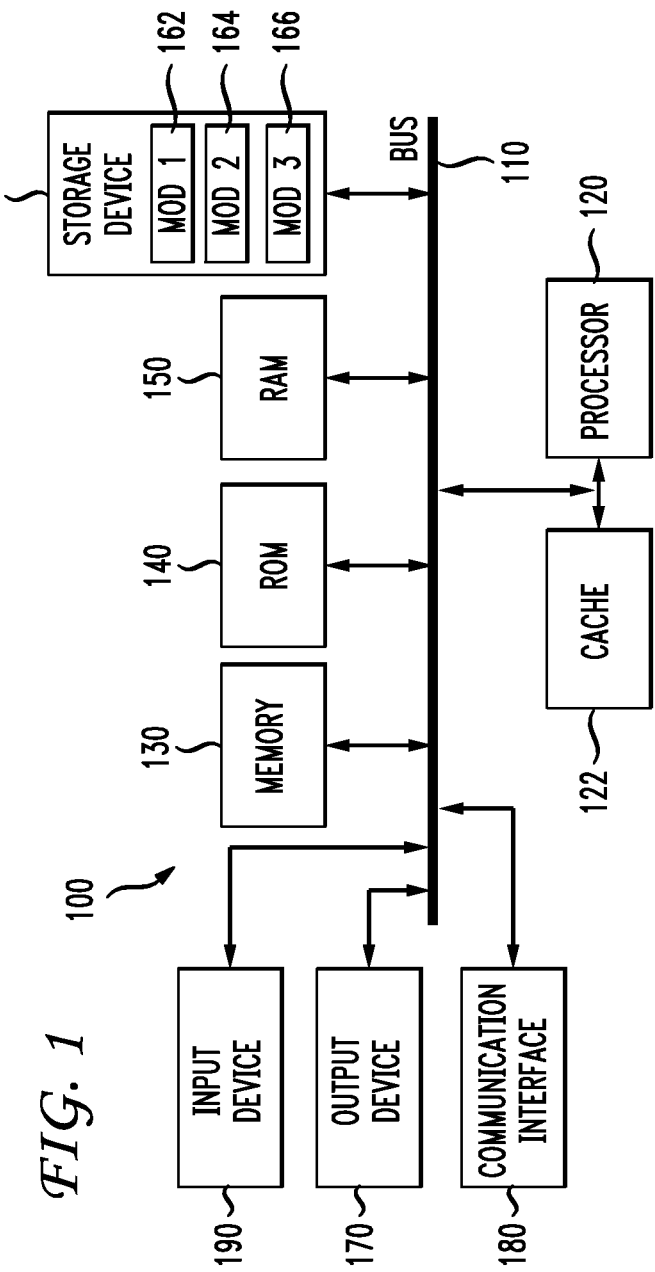
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
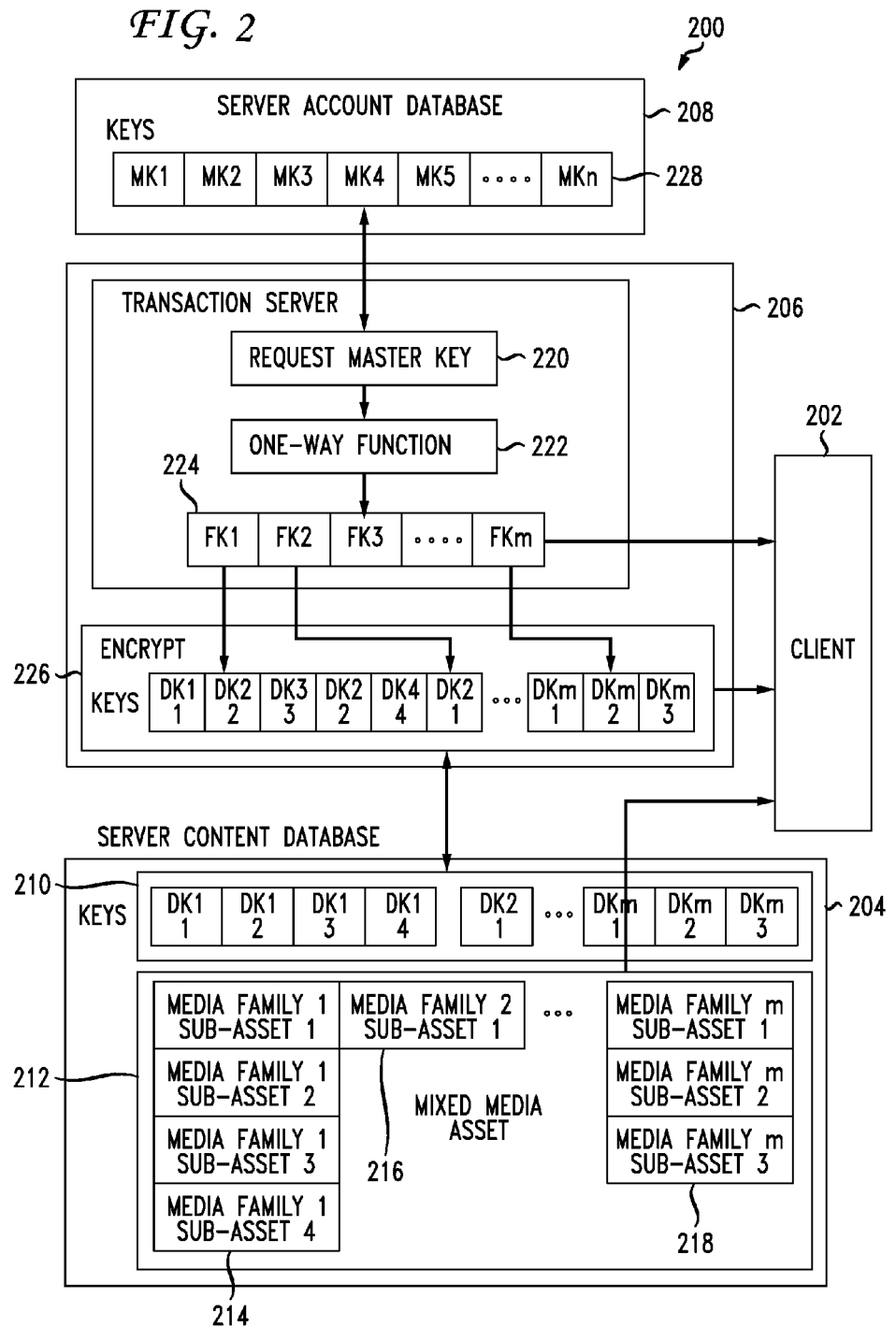
FIG. 2 illustrates an example system architecture.

Having disclosed some components of a computing system, the disclosure now returns to a discussion of secure media streaming. FIG. 2 illustrates an example system architecture 200. This architecture 200 illustrates three server components, a server account database 208, a server content database 204, and a transaction server 206, which communicate with a client 202, such as a smart phone, desktop computer, or tablet computing device. The server account database 208 contains a set of master keys 228 (MK1, MK2, . . . MKn) for each user and/or client. As additional clients or users sign up or register with the system, the number of master keys increases. The architecture 200 and the associated keys can be used to deliver content protected according to a digital rights management (DRM) scheme.

The server content database 204 contains a set of mixed media assets 212, and a set of keys 210 that encrypt the specific sub-assets 214, 216, 218 in each mixed media asset 212. Each sub-asset 214, 216, 218 of a media family N is encrypted with a different decryption key DKN,*. The server content database 204 can send the mixed media content 212 to the client 202. The client 202 authenticates itself to the transaction server 206 and sends a request to download a given asset for a given account. Then the transaction server 206 obtains a master key 228 for the account and derives a set of family keys 224 in real time or retrieves a previously derived set of family keys 224. The family keys 224 are generated by requesting the master key 220 from the server account database 208, and processing the master key with a deterministic one-way function 222. The transaction server 206 obtains the set of decryption keys DK*,* 210 from the content server database 204 and can store a local copy 226. Each of the decryption keys DKN,* 210 protects a sub-asset 214, 216, 218 of family N. In other words, each sub-asset 214, 216, 218 is encrypted with a key derived from the appropriate FKN 224. The system can encrypt the mixed media asset prior to a client request for the asset. Alternatively, the system can encrypt all or part of the mixed media asset on the fly in response to a client request for the asset.

In one variation, the transaction server 206 encrypts the content and stores the pre-encrypted content on a separately hosted server or a third-party content delivery network such as Akamai Technologies. Thus, the content is pre-encrypted and the same for every user. Then the transaction server 206 stores the decryption key in a database and when a user purchases a media asset, the transaction server 206 encrypts the decryption key with the appropriate family key, which is then used to encrypt the platform-specific media asset. Then the transaction server sends the client the decryption key and the family key, and the client can pull the media asset from the server content database 204, separately hosted server, or third-party content delivery network for playback.

This cryptographic scheme can also be modified to serve live content feeds in a secure manner. For a live media event being streamed over the Internet, the transaction server generates a new decryption key for each client that requests the live media stream, and encrypts that stream for that client with that specific derived decryption key.

In a self-publishing context, a user can upload a media asset to the server content database or other repository in order to make the media asset available for purchase and/or viewing by other users. The user can upload the content in an unencrypted form, which is stored in the server content database 204, encrypted once, and then distributed to purchasers. Thus, the decryption key for the content is the same for all users on the same platform type, and the family key changes to customize the decryption key to that specific user account because the master key, which is specific to a user account, provides the family key. One user's copy of the media asset is different from another user's copy of the media asset not because different decryption keys were used, but because different family keys were used. The master keys are unique for each account, and thus the family keys derived therefrom are also unique and specific to each account. The decryption keys are specific to the media asset.

The transaction server 206 communicates with the client 202 and transmits both the set of decryption keys DK*,* 226 for the client type and the corresponding mixed media asset 212. In this way, the client 202 can use the corresponding keys from the set of decryption keys DK*,* 226 to decode the appropriate portions of the mixed media asset 212. For example, the client 202 purchases a movie from the transaction server 206. The transaction server 206 establishes a master key 228 for that movie. The transaction server 206 uses the master key 228 to generate family keys 224 for all the different tracks or sub-assets in the movie.

A sub-asset is a particular component of an asset. In an asset that is an app for a mobile device, sub-assets can include the binaries in the app, each of the different languages the app is translated into, localization data, image data for use within the app or different image data for an icon in one or more resolutions or sizes, and/or other resources. In an asset that is a movie, sub-assets can include different video angles of the movie, different language audio tracks, video track, advertisements, closed captioning data, metadata, and so forth. From an end-user's point of view, the mixed media asset is a single asset, but it includes a combination of sub-assets.

The individual master keys 228 can also be called account keys. Each user account with the transaction server, such as an online marketplace, store, or shop, has a corresponding set of master keys. At any given time, only one master key is active per type of asset. In one variation, one master key exists for TV shows, one master key for videos, one master key for apps, one master key for eBooks, one master key for iBooks, and so forth. When a user purchases a video, for example, the server returns the encrypted media and a key capable of decrypting the encrypted media, wherein the key is derived from the appropriate master key. The server account database 208 and the transaction server 206 can be separate computing devices or a single computing device. These components 204, 206, 208 are part of the server side. The server account database 208 hands off the master key to the cryptographic component in the transaction server 206. The transaction server 206 looks up, for a video that a user is purchasing, the master key 228 for an account of that user and all the decryption keys 226 for that video. Then the transaction server 206 processes the master key 228 through a one-way hash function 222 to generate some number of sub-keys based on the actual, expected, and/or maximum number of sub-assets for the video or other mixed media asset.

The number of family keys can vary based on the media type. For example, for audio assets, an audio-specific one-way function can generate a different number of family keys and sub-asset specific decryption keys that are different than the number and/or types of keys generated by a video-specific one-way function. The transaction server 206 can then map derived keys to specific sub-assets. For example, a video-specific one-way function can generate 8 family keys, because videos have up to 8 sub-assets. A standard mapping scheme can define which family key maps to which sub-asset. For example, Family Key 1 can protect the English audio track, Family Key 2 can protect the video track, Family Key 3 can protect the German audio track, Family Key 4 can protect the closed captioning track, and so forth. The mapping scheme can reserve or set aside Family Keys for flexible use or for uses to be determined later. The transaction server or other entity can decide a different mapping for various media as an alternative to following a mapping scheme.

The transaction server 206 can incorporate multiple one-way functions for different types of mixed media assets or for different desired numbers of family keys. In another variation, the one-way function is a single function that accepts one or more parameters indicating how many family keys are desired.

The transaction server 206 then makes copies of the decryption key 226 and encrypts them with their corresponding family keys 224. The transaction server 206 then sends the full list of encrypted decryption keys 226 down to the client 202 at purchase time or thereafter. Then the server content database 204 sends the encrypted content to the client 202. The transaction server 206 also sends the appropriate family key(s) 224 to the client 202 based on the platform type of the client 202. For example, if the client 202 is a Microsoft Windows based machine, the transaction server 206 sends the client 202 family keys for Windows platforms, if the client 202 is a webOS mobile device, the transaction server 206 sends the client 202 family keys for webOS platforms. Thus, the transaction server 206 can determine the client type based on a handshake with the client 202, based on some information transmitted or advertised by the client 202, a database lookup table, a fingerprint, a parameter in an API call, or other mechanism. Different device types can include not only different devices, but different software versions, hardware revisions, and/or other configuration details of what would otherwise be considered the same device type. The transaction server 206 or a counterpart thereof can analyze an account or profile associated with the client 202 to determine if the account or profile indicates that the purchase of the media is applicable to or eligible for use with other devices. If so, the transaction server 206 can provide the corresponding family keys to those other eligible devices. The transaction server 206 can distribute these other family keys to the other eligible devices at the time of purchase, upon request from an eligible device, upon user authorization of the eligible device, and/or at any other time.

Because the extra family keys are generated on the server side and only family keys which are applicable for a specific device type are shared with the device, the additional family keys are hidden from the client, thereby increasing security of the encryption scheme. Thus, an attacker is unable to effectively mount an attack on one platform using a family key for a different platform. This encryption scheme arrangement means that an attacker must go to a device of each platform type in an attempt to harvest the respective family keys and must then attack each platform type individually. The individual copies of the family key on each platform are protected with different cryptographic schemes. In effect, the transaction server 206 prunes or restricts client access to all the keys that this particular client doesn't need and protects them with the platform specific cryptography that only that client understands.

Some additional detail is not shown in FIG. 2 that relates to standard per-platform subdivision. The difference in the approach set forth herein is that the two different family keys are protected with two different cryptographic schemes, meaning that even if an attacker breaks the cryptography on one client platform, they don't have the clear text value of the master key which could be used to successfully attack or compromise a second client platform.

In case of a successful attack or a compromise of a family key, the system can change the cryptographic scheme for the compromised family key or for the entire set of compromised family keys. However, simply replacing, changing, or refreshing the keys with different values is not an elegant solution because changing a family key that has already been sent to a client for a given piece of content would render that piece of content unplayable, which is a very bad user experience. When the system determines that one or more specific keys have been compromised, the transaction server 206 can flag those compromised keys in a server account database 208. A marker is placed in the server account database 208 indicating that any keys before this marker are compromised and should only use old cryptographic schemes, and any keys after this marker should use new cryptographic schemes.

Then all new purchases from that point on will use new master keys. The system does not reuse old master keys that have been compromised. Thus, one approach for handling compromised keys without sacrificing the user experience. Once a compromise is detected, the system can protect only new purchases with the new scheme and/or new master keys. In short, this approach does not attempt to reprotect old purchases because that would involve regenerating the keys and reencrypting the content. This compromise allows a user to continue to play backed-up content without problems.

The transaction server 206 can select family keys based on other criteria besides or in conjunction with the client platform type. For example, family keys can be selected based on date, content duration, content rating, an organization associated with the client, a client IP address, user account information, device-specific settings, and so forth. In a simple date/time based example, on Mondays the transaction server can use family key 1, on Tuesdays the transaction server can use family key 2, and so forth. In these variations, the client 202 can include some logic or algorithm to determine which family key to use, or the transaction server 206 can simply 'prune' out unneeded family keys when sending family key information to the client. Selecting family keys based on these other factors can lead to a potential vulnerability if an attacker can detect a pattern and possibly use that pattern to exploit the protection scheme.

Figure 3:
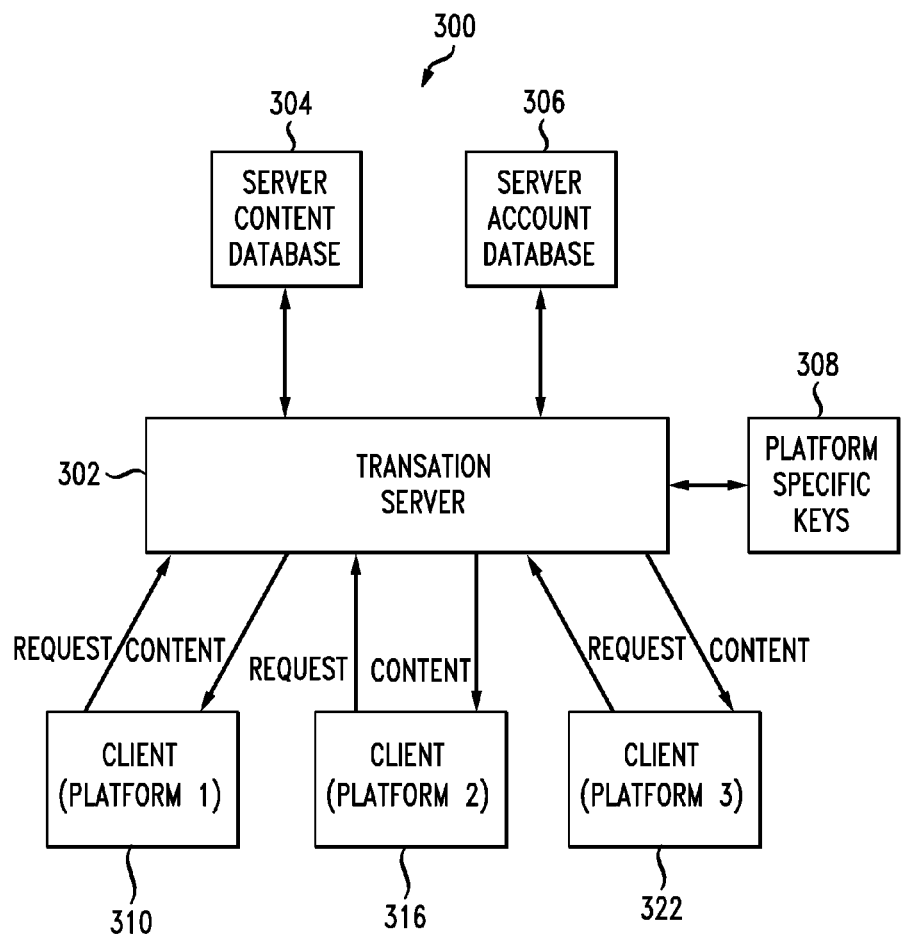
FIG. 3 illustrates an example distribution between clients of different platforms.

FIG. 3 illustrates an example architecture 300 for media distribution to clients that are of different platform types. The transaction server 302 receives requests for content from multiple clients 310, 316, 322 of different platform types, such as an OS X client, an iOS client, a Windows client, a Symbian client, or other media playback platform type. The transaction server detects the device type associated with the request, and coordinates with the server account database 306 to obtain the proper platform specific keys 308 to service the request. Then the transaction server 302 retrieves the appropriately encrypted content from the server content database 304, and sends to the client 310 the appropriately encrypted content and at least one of the corresponding family keys. Then the client can derive the correct decryption keys from the family key, and use the decryption keys to decrypt and play back the content. Thus, a family key encrypts decryption keys, and the decryption keys encrypt the various media sub-assets. Family keys allow the transaction server 302 to protect the different decryption key groups differently for different platforms and for different mixed media sub-assets.

At playback time, the client 310 identifies the media family of a sub-asset using meta-data. The appropriate family key can be identified through a mathematical property of a number used as the unique identifier of the key. The client uses the family key to decrypt the decryption key for that asset using the specific media family's media decoding engine or presentation pipeline.

Having disclosed some basic system components and concepts, the disclosure now turns to the exemplary method embodiments shown in FIGS. 4-7. For the sake of clarity, the methods are discussed in terms of an exemplary system 100 as shown in FIG. 1 configured to practice the method. The steps outlined herein are exemplary and can be implemented in any combination thereof, including combinations that exclude, add, or modify certain steps.

Figure 4:
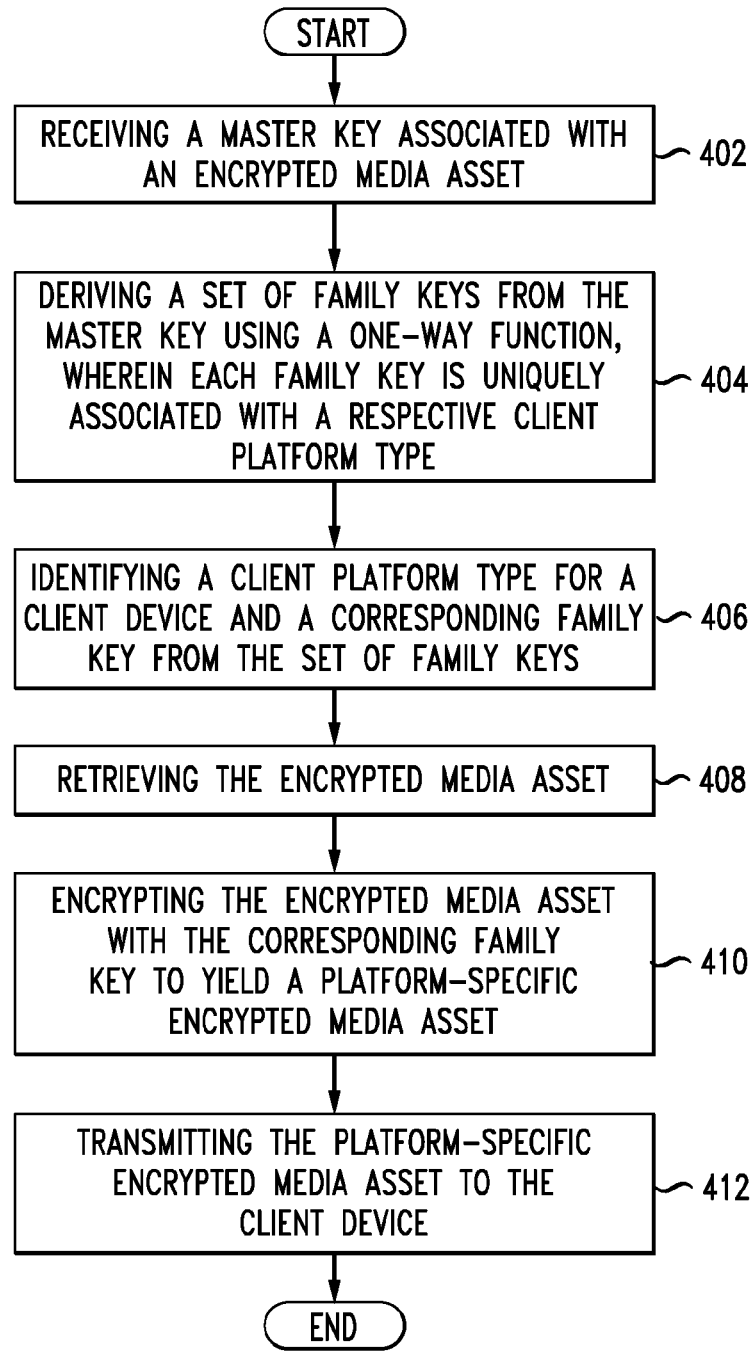
FIG. 4 illustrates an example method embodiment for secure media distribution.

FIG. 4 illustrates an example method embodiment for secure media distribution such as the architecture 200 shown in FIG. 2. A system practicing the exemplary method receives a master key associated with an encrypted media asset (402), such as from a server account database or other repository, and derives a set of family keys from the master key using a one-way function, wherein each family key is uniquely associated with a respective client platform type (404). The master key can be unique to an account associated with the client device.

After identifying a client platform type for a client device and a corresponding family key from the set of family keys (406), the system retrieves the encrypted media asset (408) and encrypts the encrypted media asset with the corresponding family key to yield a platform-specific encrypted media asset (410). The system can identify the client platform type as part of a client request for the encrypted media asset. Alternatively, the client platform type can be determined based on at least one of a hardware revision, a software version, and device configuration information. Then the system can transmit the platform-specific encrypted media asset to the client device (412), and transmit the corresponding family key to the client device. When sending the corresponding family key, the system can prune unnecessary family keys from the set of family keys to yield a set of client platform specific family keys, and transmit to the client device the set of client platform specific family keys.

In an alternative method embodiment, the system derives a set of family keys from a master key associated with an encrypted media asset using a one-way function, wherein each family key is uniquely associated with a respective client platform type, wherein the master key is received from a server account database. The system identifies a client platform type for a client device and a corresponding family key from the set of family keys, and retrieves the encrypted media asset. The system encrypts the encrypted media asset with the corresponding family key to yield a platform-specific encrypted media asset, and transmits the platform-specific encrypted media asset to the client device.

Figure 5:
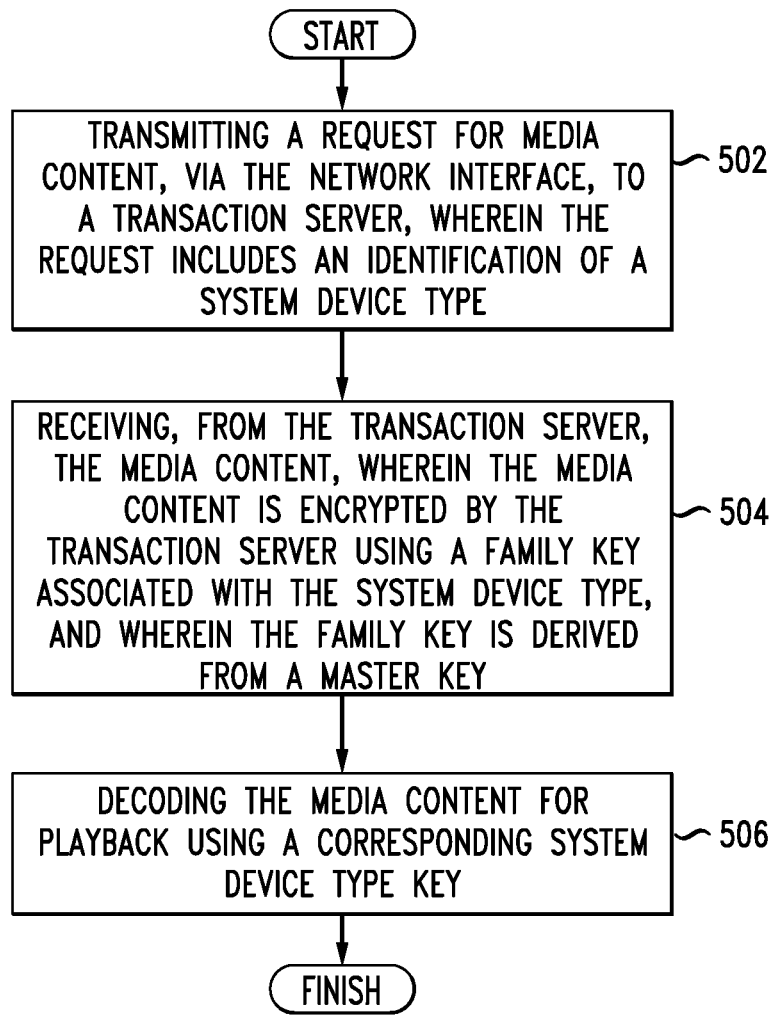
FIG. 5 illustrates an example method embodiment for client-side retrieval and playback of secure media.

FIG. 5 illustrates an example method embodiment for client-side retrieval and playback of secure media, such as the client 202 of FIG. 2. An exemplary client transmits a request for media content to a transaction server, wherein the request includes an identification of a system device type (502). The client receives the media content from, for example, a transaction server, a server content database, or a content distribution network. The media content can be encrypted by the transaction server using a family key associated with the system device type, and the family key can be derived from a master key (504). The media content can be encrypted in response to the request for the media content or prior to the request for the media content. Then the client can decode the media content for playback using a corresponding system device type key (506).

FIG. 6 illustrates an example method embodiment for a server content database, such as the server content database 204 shown in FIG. 2. An exemplary content server receives a set of family keys derived from a master key associated with a media asset, wherein each family key in the set of family keys is uniquely associated with a respective client platform type (602). The content server encrypts the media asset with each of the set of family keys to yield a set of platform-specific encrypted media assets (604). The content server can encrypt the media asset by identifying sub-assets in the media asset, identifying a respective sub-key for each of the sub-assets, and encrypting each of the sub-assets with the respective sub-key. Respective sub-keys can be derived from a corresponding family key from the set of family keys. The content server can encrypt the media asset in response to a purchase of the media asset, a request for the media asset, or a submission of the media asset for ingestion into a content database.

In response to a media playback request from a client device, determines a platform type for the client device (606). Based on the platform type, the content server transmits a corresponding one of the set of platform-specific encrypted media assets to the client device for playback. The corresponding one of the set of platform-specific encrypted media assets can be viewable on the client device based on an available key on the client device.

FIG. 7 illustrates an example method embodiment for a transaction server, such as the transaction server 206 illustrated in FIG. 2. An exemplary transaction server derives, from a master key associated with a media asset, a set of family keys using a one-way function, wherein each family key is uniquely associated with a respective client device type (702). The one-way function can be a deterministic function, and can be specific to a particular media asset type, such that function 1 is used for video, function 2 is used for audio, function 3 is used for applications, and so forth. Then the transaction server instructs a content database to generate respective encrypted media sub-assets using the set of family keys, wherein each respective encrypted media sub-asset is uniquely associated with one respective client device type, and wherein each respective encrypted media sub-asset is playable only on the one respective client device type (704). The size of the set of family keys can be based on a media asset type and/or a number of target sub-assets. The transaction server can also transmit a device-specific subset of the set of family keys to a client device to enable the client device to play back the encrypted media sub-asset.

While the example applications set forth herein focus primarily on digital content distribution, these principles can be adapted for other applications as well. For example, these key space division and sub-key derivation principles can be applied to banking. A bank can interface with many other banks, and may need to send the same data to different banks, and for security or privacy reasons, may desire to encrypt the same data differently for each bank. This approach can allow the banks to communicate such that if one link gets compromised between bank A and bank B, the link between bank A and bank C is not automatically compromised using the information obtained in the compromised link. Thus, rather than storing N keys for each bank, the system can store just one key, and derive the required keys each time.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving a master key associated with an encrypted media asset;
   deriving a set of family keys from the master key using a one-way function, wherein each family key is uniquely associated with a respective client platform type;
   identifying a client platform type for a client device and a corresponding family key from the set of family keys;
   retrieving the encrypted media asset;
   encrypting the encrypted media asset with the corresponding family key to yield a platform-specific encrypted media asset; and
   transmitting the platform-specific encrypted media asset to the client device.

2. The method of claim 1, wherein the master key is received from a server account database.

3. The method of claim 1, further comprising:
   transmitting the corresponding family key to the client device.

4. The method of claim 1, wherein the one-way function is deterministic.

5. The method of claim 1, wherein the client platform type is identified as part of a client request for the encrypted media asset.

6. A system comprising:
   a processor;
   a network interface;
   a memory storing instructions for controlling the processor to perform a method comprising:

transmitting a request for media content, via the network interface, to a transaction server, wherein the request includes an identification of a system device type;

receiving the media content, wherein the media content is encrypted using a family key associated with the system device type, and wherein the family key is derived from a master key; and decoding the media content for playback using a corresponding system device type key.

7. The system of claim 6, wherein the media content is received from one of the transaction server, a server content database, and a content distribution network.

8. The system of claim 6, wherein the media content is encrypted by the transaction server.

9. The system of claim 6, wherein the media content is encrypted in response to the request for the media content.

10. The system of claim 6, wherein the media content is encrypted prior to the request for the media content.

11. A non-transitory computer-readable storage medium storing instructions which, when executed by a computing device, cause the computing device to perform steps comprising:

deriving a set of family keys from a master key associated with an encrypted media asset using a one-way function, wherein each family key is uniquely associated with a respective client platform type, wherein the master key is received from a server account database;

identifying a client platform type for a client device and a corresponding family key from the set of family keys;

retrieving the encrypted media asset;

encrypting the encrypted media asset with the corresponding family key to yield a platform-specific encrypted media asset; and transmitting the platform-specific encrypted media asset to the client device.

12. The non-transitory computer-readable storage medium of claim 11, wherein the master key is unique to an account associated with the client device.

13. The non-transitory computer-readable storage medium of claim 11, wherein the client platform type is based on at least one of a hardware revision, a software version, and device configuration information.

14. The non-transitory computer-readable storage medium of claim 11, the instructions further comprising:

pruning unnecessary family keys from the set of family keys to yield a set of client platform specific family keys; and transmitting to the client device the set of client platform specific family keys.

15. A method comprising receiving a set of family keys derived from a master key associated with a media asset, wherein each family key in the set of family keys is uniquely associated with a respective client platform type;

encrypting the media asset with each of the set of family keys to yield a set of platform-specific encrypted media assets; and in response to a media playback request from a client device, determining a platform type for the client device, and, based on the platform type, transmitting a corresponding one of the set of platform-specific encrypted media assets to the client device for playback.

16. The method of claim 15, wherein encrypting the media asset further comprises:

identifying sub-assets in the media asset;

identifying a respective sub-key for each of the sub-assets; and encrypting each of the sub-assets with the respective sub-key.

17. The method of claim 16, wherein respective sub-keys are derived from a corresponding family key from the set of family keys.

18. The method of claim 15, wherein the media asset is encrypted in response to at least one of a purchase of the media asset, a request for the media asset, and a submission of the media asset for ingestion into a content database.

19. The method of claim 15, wherein the corresponding one of the set of platform-specific encrypted media assets is viewable on the client device based on an available key on the client device.

20. A system comprising:

a processor;

a memory storing instructions for controlling the processor to perform a method comprising:

deriving, from a master key associated with a media asset, a set of family keys using a one-way function, wherein each family key is uniquely associated with a respective client device type; and instructing a content database to generate respective encrypted media sub-assets using the set of family keys, wherein each respective encrypted media sub-asset is uniquely associated with one respective client device type, and wherein each respective encrypted media sub-asset is playable only on the one respective client device type.

21. The system of claim 20, wherein the one-way function is deterministic.

22. The system of claim 20, wherein the one-way function is specific to a media asset type.

23. The system of claim 20, wherein a size of the set of family keys is based on at least one of a media asset type and a number of target sub-assets.

24. The system of claim 20, further comprising transmitting a device-specific subset of the set of family keys to a client device.

* * * * *